Figure 1:
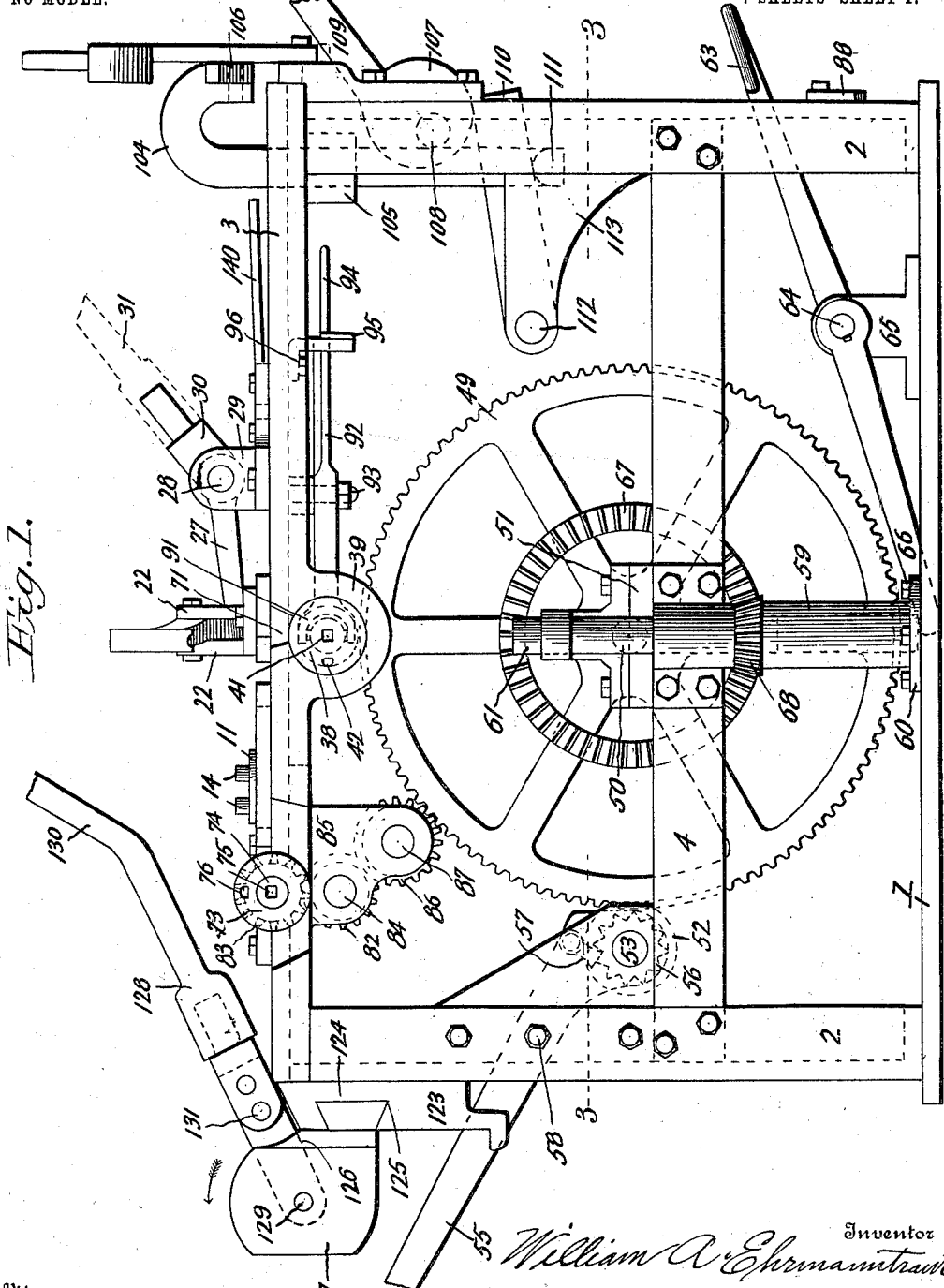

No. 731,294. PATENTED JUNE 16, 1903.
W. A. EHRMANNTRAUT.
MACHINE FOR BENDING AND TWISTING IRON RODS FOR MAKING LADDERS, &c.
APPLICATION FILED DEC. 27, 1902.
NO MODEL. 7 SHEETS—SHEET 1.

Witnesses
C. H. Walker
J. M. Moore

Inventor
William A. Ehrmanntraut
By Albert Popkins
his Attorney

No. 731,294. PATENTED JUNE 16, 1903.
W. A. EHRMANNTRAUT.
MACHINE FOR BENDING AND TWISTING IRON RODS FOR
MAKING LADDERS, &c.
APPLICATION FILED DEC. 27, 1902.
NO MODEL. 7 SHEETS—SHEET 2.
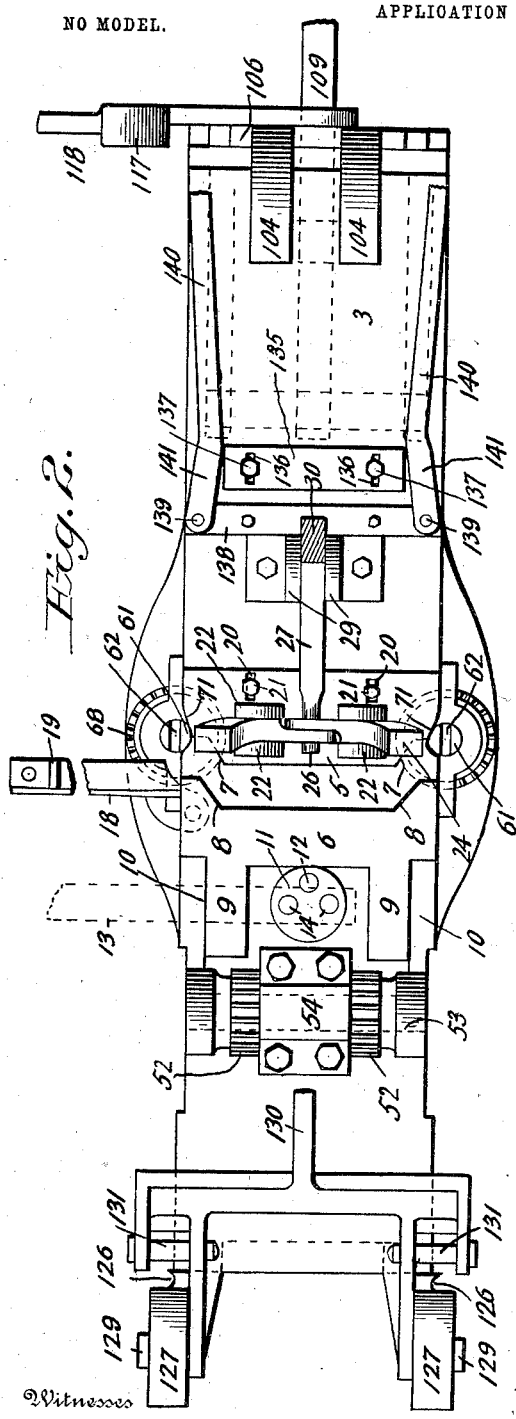
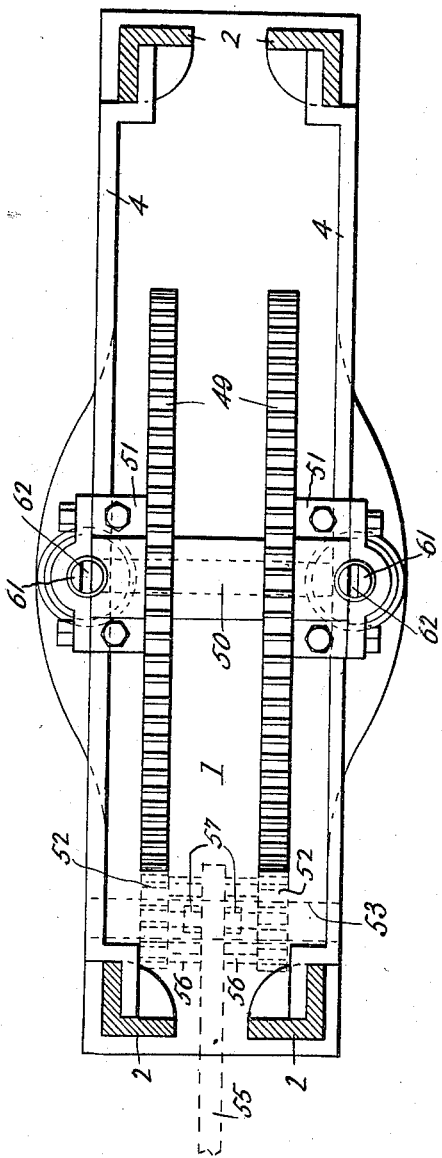
Witnesses
C. H. Walker.
J. W. Moore.
Inventor
William A. Ehrmanntraut
By Albert Popkins
his Attorney

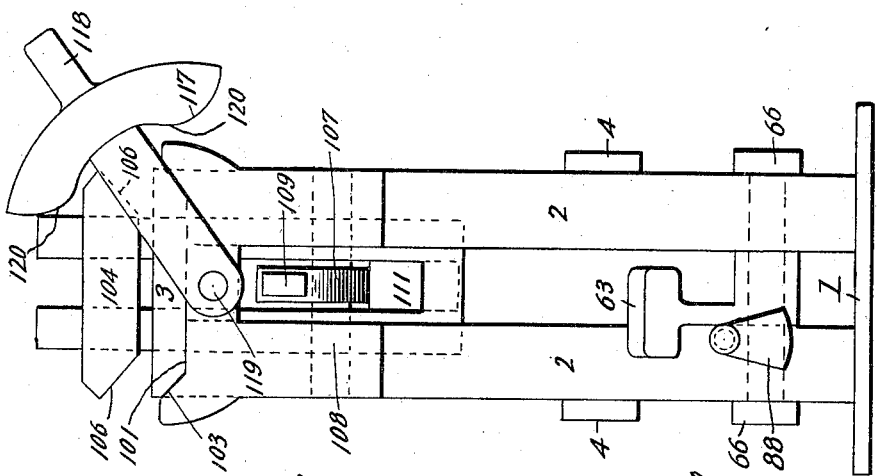
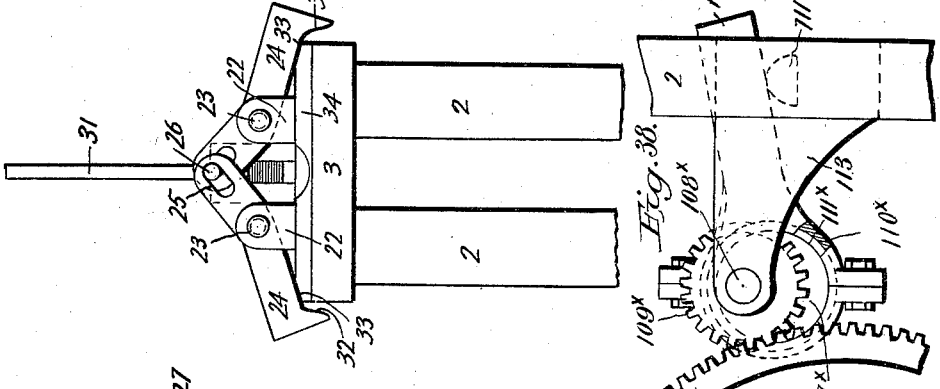
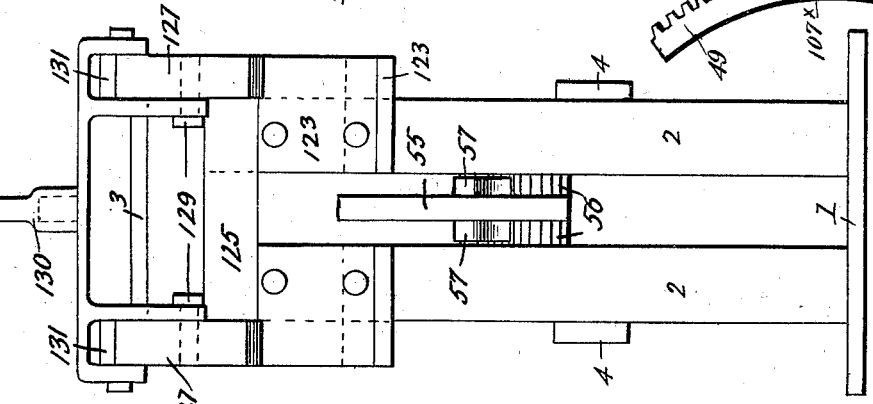

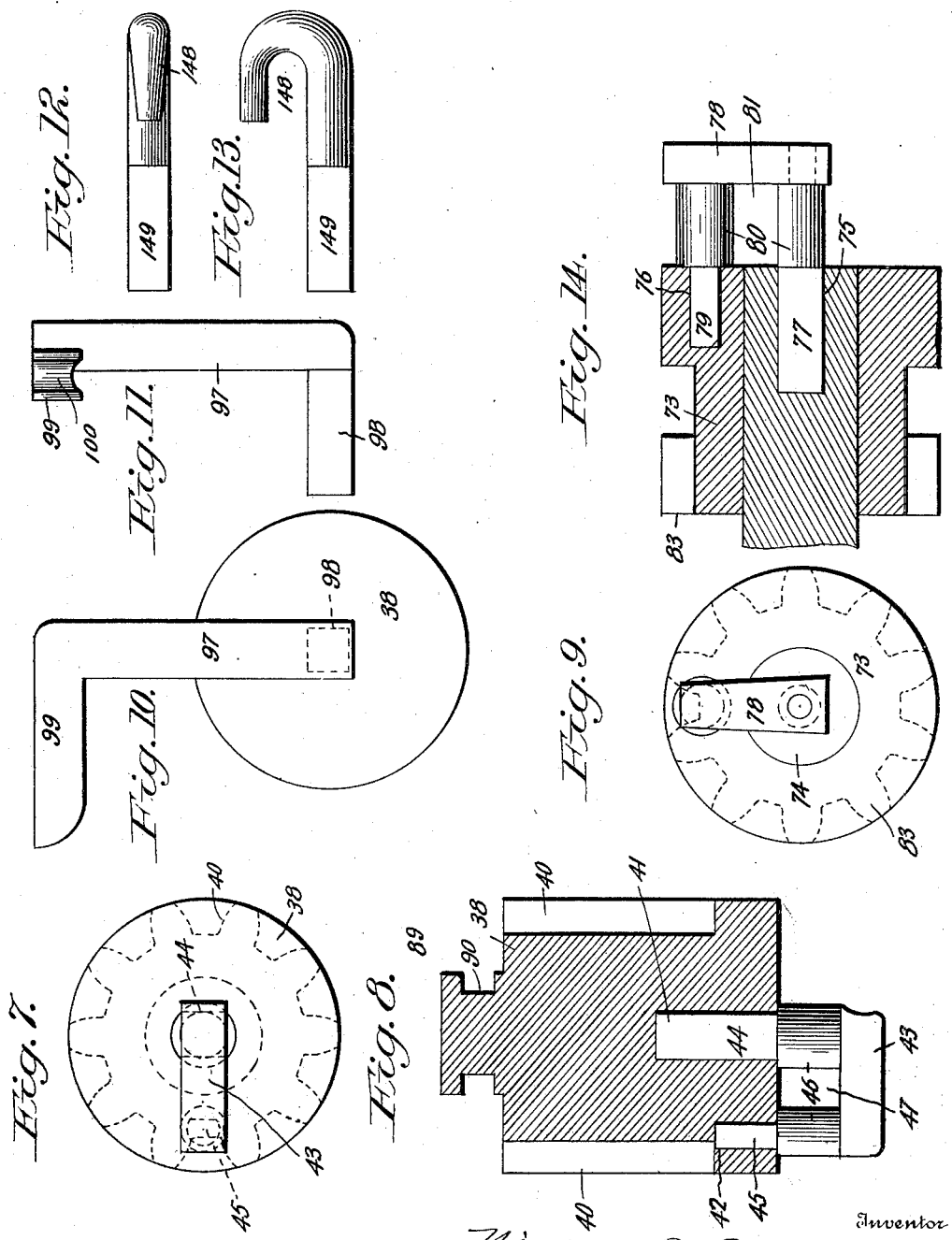

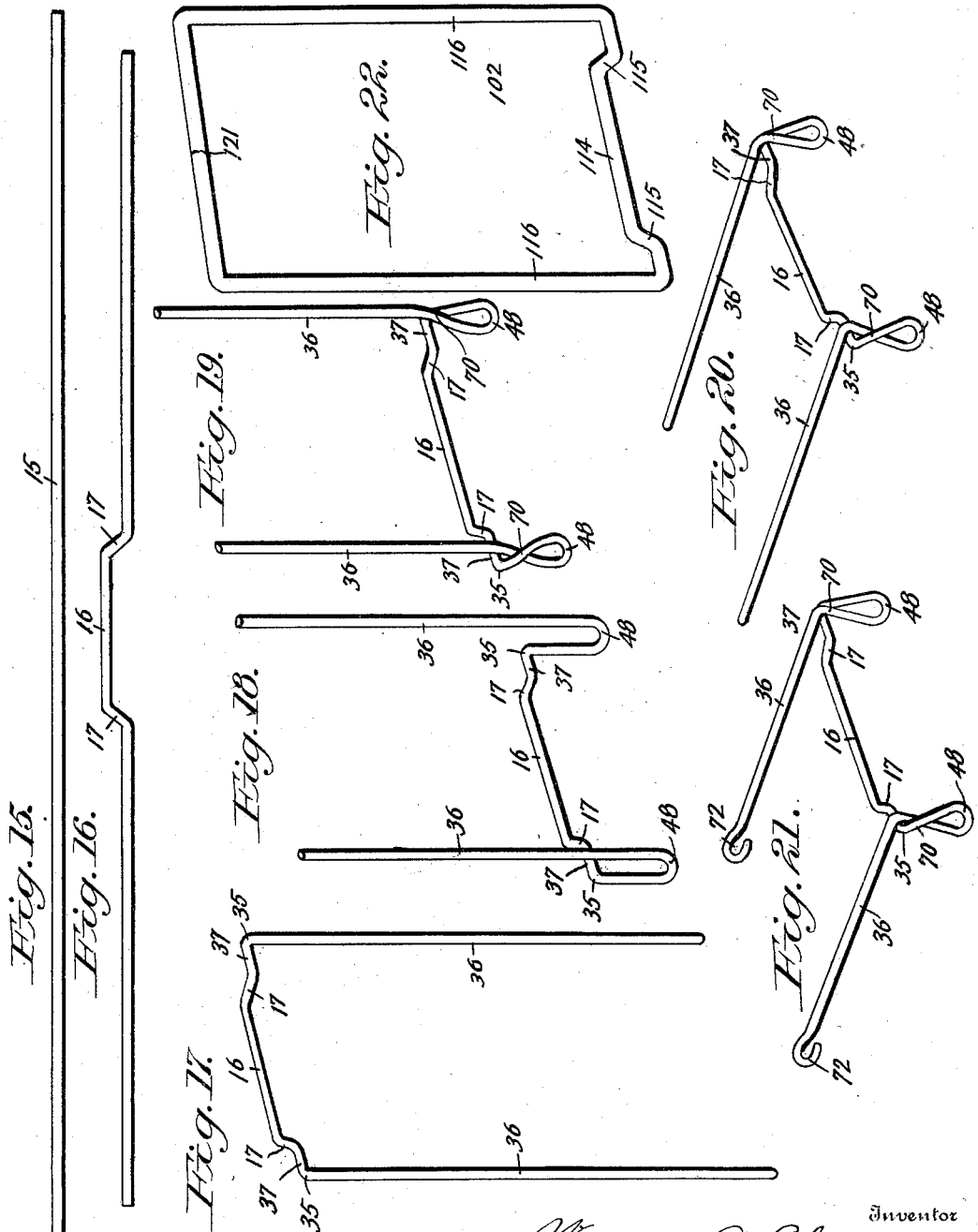

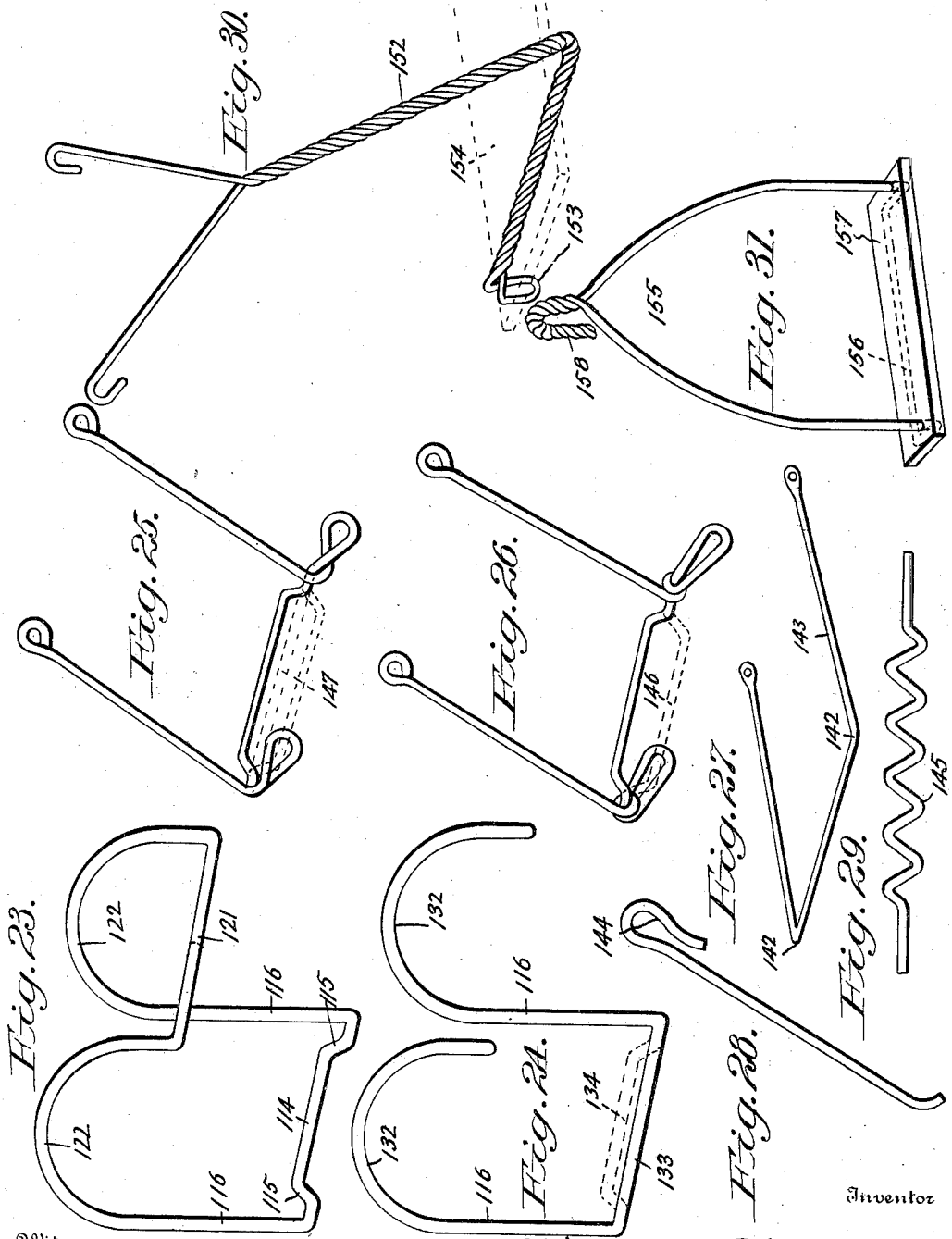

No. 731,294. PATENTED JUNE 16, 1903.
W. A. EHRMANNTRAUT.
MACHINE FOR BENDING AND TWISTING IRON RODS FOR MAKING LADDERS, &c.
APPLICATION FILED DEC. 27, 1902.
NO MODEL. 7 SHEETS—SHEET 7.
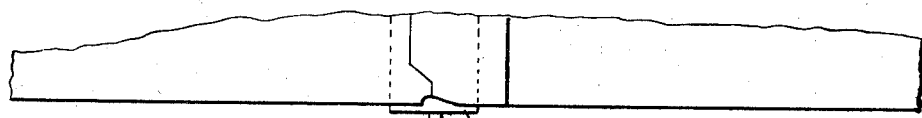
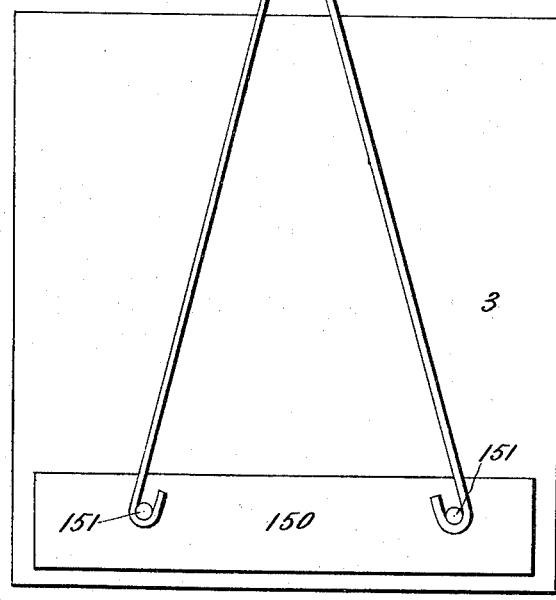
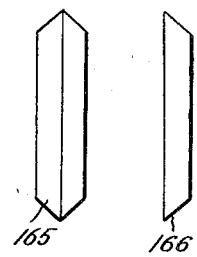
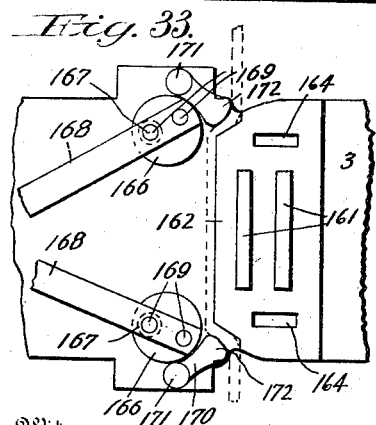
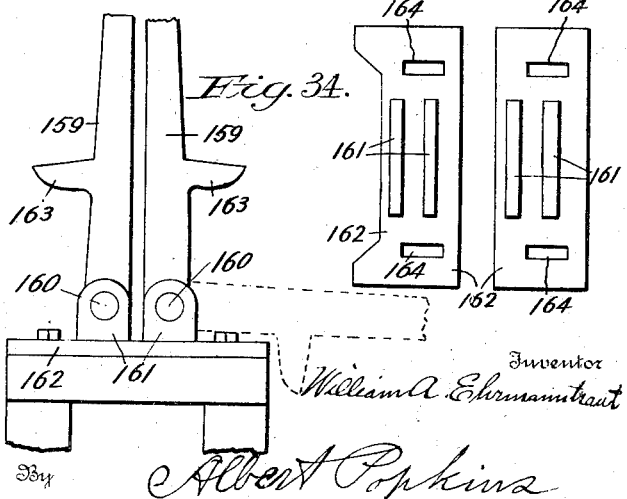

No. 731,294.

Patented June 16, 1903.

UNITED STATES PATENT OFFICE.

WILLIAM A. EHRMANNTRAUT, OF NORFOLK, VIRGINIA, ASSIGNOR OF ONE-FOURTH TO M. W. BURK, OF NORFOLK, VIRGINIA.

MACHINE FOR BENDING AND TWISTING IRON RODS FOR MAKING LADDERS, &c.

SPECIFICATION forming part of Letters Patent No. 731,294, dated June 16, 1903.

Application filed December 27, 1902. Serial No. 136,821. (No model.)

*To all whom it may concern:*

Be it known that I, WILLIAM A. EHRMANNTRAUT, a citizen of the United States, residing at Norfolk, in the county of Norfolk and State of Virginia, have invented certain new and useful Improvements in Machines for Bending and Twisting Iron Rods for Making Ladders, &c.; and I do hereby declare the following to be a full, clear, and exact description of the invention, such as will enable others skilled in the art to which it appertains to make and use the same.

This invention relates to certain new and useful improvements in machines for bending and twisting metal in either a hot or cold state for making ladders, ledge-hooks, awning-frames, and devices of such nature; and it has for its objects, among others, to provide a simple and cheap yet efficient and durable machine easily operated, possessing great power, and readily adapted for the various uses to which it may be put.

The machine is adapted for hand operation, or other power may be readily employed, if desired. The various parts, which are made interchangeable, so as to permit of the making of the different articles, can be applied or removed by unskilled labor, and when once in position they do their work without further attention on the part of the attendant or operator.

Other objects and advantages of the invention will hereinafter appear, and the novel features thereof will be particularly pointed out in the appended claims.

The invention in its preferred form is clearly illustrated in the accompanying drawings, which, with the numerals of reference marked thereon, form a part of this specification, and in which—

Figure 1 is a side elevation of my improved machine. Fig. 2 is a top plan with portions broken away and the bending-lever-actuating lever in section. Fig. 3 is a horizontal section on the line 3 3, Fig. 1, with parts removed. Fig. 4 is an end elevation. Fig. 5 is a detail in elevation, showing the main bending-levers. Fig. 6 is an end elevation looking at the opposite end and showing the mechanism for forming the ledge-hooks. Fig. 7 is an end elevation of the twisting-disk with one of the implements in position. Fig. 8 is a substantially central longitudinal section through the same. Fig. 9 is another view of the disk, showing a different implement in position. Fig. 10 is another view of the disk, showing another implement in position. Fig. 11 is an elevation of the implement shown in Fig. 10 removed. Fig. 12 is an edge view of one of the twisting-hooks. Fig. 13 is a side elevation thereof. Fig. 14 is a substantially central longitudinal section of the disk seen in Fig. 9 with its implement therein. Fig. 15 represents the bar from which a ladder-link is formed. Fig. 16 represents a similar view of the same after the first step in the operation. Fig. 17 represents the appearance of the bar after the next step has been performed. Fig. 18 shows the formation after the next step. Fig. 19 shows the same after it has been acted upon by the next succeeding implement. Fig. 20 represents the same in the position it assumes to have the hooks formed upon the ends of its side bars. Fig. 21 represents the same after the hooks have been formed. Fig. 22 is a view of the ledge-hook after it has undergone some of its operations and before the hook proper has been formed. Fig. 23 is a perspective view of the ledge-hook complete. Fig. 24 is a similar view showing another form of ledge-hook. Fig. 25 is a perspective view of another form of ladder section or link. Fig. 26 shows still another form thereof. Fig. 27 is a view of an awning-frame such as may be made from my machine. Fig. 28 shows a form of hook designed for use in connection with the ledge-hook or for other purposes. Fig. 29 shows a sample of crimped rod produced by my machine. Fig. 30 illustrates a support for shelving, painters' scaffold, or the like. Fig. 31 shows still another form of support for a shelving or other article. Fig. 32 shows an attachment to the machine for forming the hanger or support seen in Fig. 30 or other twisted work. It is a plan view. Fig. 33 is a detail in plan view, showing a modified form of construction for forming the initial bend in the rod. Fig. 34 is a modification in elevation of the construction seen in Fig. 5. Fig. 35 shows the die-plates, illustrating the manner in which different forms of cross portions may be given to the ladder-section. Fig. 36 shows one of the dies removed; and Fig. 37 shows another die, also removed. Fig. 38 shows in elevation a detail of a slight modification.

Like numerals of reference indicate like parts throughout the several views.

Before proceeding with the description of the machine and the manner in which it is operated it is desired to call special attention to the fact that by the construction soon to be described the material is not pressed to form the bend, which action I have found to be injurious and tending to weaken the articles at such points, but that all bends are formed by a pull over a corner or projection, whereby the material is in no wise weakened and better results are attained.

Referring now to the details of the drawings, 1 designates the base or bed plate of the machine, from which rise the standards 2, upon which is supported the bed or table 3.

4 designates longitudinal braces or timbers joining the end pieces or standards 2 and serving as a support for boxings or bearings, as will be hereinafter more clearly set forth.

Mounted upon the table or upper portion 3 is the stationary die or plate 5, while 6 is the movable die or plate adapted for coöperation therewith. As shown in Fig. 2, the stationary plate 5 has its ends formed upon inclines, as at 7, while the adjacent and coöperating face of the movable die or plate has the corresponding inclines or bevels 8, and by these provisions the metal bar or rod is given the primary bend which forms the cross portion and in a ladder step or tread. The movable die or plate 6 is guided in its movement in any suitable manner, as by the extensions 9 on said die or plate coöperating with the guides 10 on the table or platform 3. When operated by hand, I provide for the actuation of the movable die or plate 6 by a cam 11, pivotally mounted, as at 12, and designed to be actuated in any suitable manner, as by a lever 13, (indicated by dotted lines in Fig. 2,) and designed to engage the pins or projections 14 of said cam to operate the same to force the plate or die 6 toward the fixed plate 5. This gives to the bar 15, which is shown in Fig. 15 in its form as presented to the machine, the bend or offset 16, with the inclined connecting portions 17, which latter are formed by the inclines 7 and 8 of the fixed and movable plates or dies, respectively. In introducing the rod or bar 15 to the machine it is placed transversely of the same, and as a guide therefor to bring the same in the proper relative position I provide at one side of the machine the guide and support 18, which has a stop or lug 19, against which the end of the bar is designed to engage, as will be readily understood from Fig. 2. This operation of forming the offset 16 in the rod is the initial step in the process.

The stationary plate or die 5 is designed for attachment to accommodate it to different sizes of iron and to the different character of devices to be produced, and for this purpose I provide the said plate or die with the slots 20, in which are engaged the bolts or analogous means 21, which permit of the necessary adjustment of the plate or die and the securing of the same in its adjusted positions.

Rising from the bed 3 at substantially the center of the machine are lugs 22, in which are pivotally mounted, as at 23, the bending-levers 24, the upper ends of which are slotted, as at 25, the said upper ends of the levers overlapping, as seen best in Fig. 5, and a pin 26 passed through the slots of both levers, said pin being formed on the end of an operating-lever 27, pivotally mounted at 28 in the lugs or ears 29, suitably secured to the bed or table 3, and the lever then extended, as at 30, to receive the operating-handle 31. The free ends of the levers 24 are formed with the recesses 32, which are adapted to receive the rod or bar, and when the lever 31 is operated to force the levers downward, the latter at the said recesses engaging over the corners 33 of the die 34 on the bed or table 3, they form the bends 35 in the rod or bar and force the free ends down into position upon opposite sides of the machine to form the parallel side arms 36. At the same time the angular portions 17 are bent, so as to form the portions 37, which are substantially parallel with the portion 16 and at right angles to the side bars 36, as seen clearly in Fig. 17, which represents the rod or bar after it has been through this step of the process. It is to be understood that the cross portion 16 is during these steps held firmly between the plates 5 and 6. After the side bars 36 and the bends at the points 35 have been made the next step is to form the loops or bends adjacent the bends 35. This is accomplished in the following manner:

38 is a disk or cylindrical bar mounted in suitable bearings 39, depending from the upper portion 3 of the frame, as seen best in Fig. 1, and this disk is circumferentially toothed, as at 40, to form a gear which is designed to mesh with a gear on the main driving-shaft, as will soon be explained. This disk is provided centrally with a rectangular opening 41 and with an eccentric opening 42, as seen clearly in Fig. 1.

43 is a bending-tool designed to be detachably engaged in the outer end of the disk, having for this purpose a rectangular stud 44 and a pin 45, the former adapted to engage the rectangular disk 41 and the latter to engage the rectangular opening 42 in the end of the disk. This bending-tool is seen clearly in its operative position in Fig. 8. It has the two parallel cylindrical or rounded portions 46, between which the bar is to be received. It is to be understood that there is one of these disks and tools at each side of the machine, so that the loops or bends upon opposite sides of the bar may be formed simultaneously.

After the bar has been formed into the shape shown in Fig. 17 the tools 43 are placed in position in the disks upon opposite sides of the machine, the bar portions 36 being received in the openings 47 between the portions 46, and the disks are then rotated to form the bends 48. (Seen in Fig. 18.) The disks are rotated in the following manner:

49 designates gears on the shaft 50, mounted in suitable boxings or bearings 51 on the braces 4, as seen clearly in Figs. 1 and 3, and these gears are designed to mesh with the gears 40 of the disks 38, so that as the gears 49 are rotated simultaneous rotary motion will be given to the disks to rotate the same and form the bends 48. The gears 49 are rotated by the gear-wheels 52 on a shaft 53, mounted in a boxing 54, suitably supported from the frame, and this shaft is provided with an operating-lever 55. On said shaft is a ratchet 56, with which engages a pawl 57 to prevent retrograde movement, as will be readily understood. The lever 55 is pivotally mounted at 58 on the standards 2 of the frame.

After the bar has been given the shape seen in Fig. 18 the lower ends of the loops or bends 48 are given a twist, which is accomplished in the following manner:

59 designates standards secured at 60 to the base 1, and these are made hollow, and within each of them is a twister 61, having at its upper end a slot 62, into which the lower portions of the bend are adapted to be received. These twisters are vertically movable within the members 59 by means of a treadle 63, fulcrumed at 64 on the standard or support 65, and the other end 66 designed to engage beneath the twisters. The treadle being depressed, the twisters are moved upward, so that their slots 62 engage lower portions of the bends, and after this has been done the lever 55 is manipulated so as to rotate the gears 49. This by reason of the bevel-pinion 67 on the shaft 50 and the bevel-pinion 68 on the twisters causes the latter to be rotated sufficiently to give the twists 70 to the bar, as seen in Fig. 19. The upper portions of the side bars of the bed 3 are cut away, as at 71, to provide for the twisting, as will be readily understood upon reference to Figs. 1 and 2. The bar having been brought into the shape shown in Fig. 19 is turned so that its members 36 are brought into a horizontal position, as seen in Fig. 20, and they are then ready to be given the bends which form the hooks or the eyes 72 in the free ends of the said arms 36. For this purpose disks 73 are provided. They are loosely mounted on the shaft 74, so as to occasion no pull on the metal, and the shaft is provided with a rectangular opening 75 and the disk with an opening 76. Into the central opening is designed to be inserted the rectangular stud 77 of the twister or bender 78, which has the stud 79, which is received in the opening 76 of the disk. This twister, like the twister 38, is provided with the cylindrical portions 80, and in the opening 81 between them the ends of the members 36 of the rod are received. Fig. 14 shows the twister 80 in position to twist the ends of the members 36 to form the bends or hooks 72 therein. For rotating this twister it is formed with gear-teeth 83, designed to engage with a gear 82 on a shaft 84, mounted in a bracket 85, and which in turn meshes with a gear 86 on a shaft 87, also supported in said bracket and meshing with the gear 49. It is to be understood, of course, that these devices are upon opposite sides of the machine. The twisters 80 being in position, the lever 55 is manipulated to turn the gears 49, and through the medium of the gears 86, 82, and 83 the twisters 80 are revolved sufficiently to give the necessary twist to the bar to form the loops or hooks 72, as will be readily understood.

88 is a gravity-latch designed to engage the treadle 63 to hold the same in its lowermost position when desired to hold the twisters permanently elevated.

When the twists 70 are being formed, it is desirable to have the disks 38 moved inward out of the way. For this purpose I form the inner end of the disk with a head 89 with an annular groove 90, in which is engaged the yoke 91 of a lever 92, pivotally mounted at 93 on the under side of the bed 3 of the machine, and the handle portion 94 is designed to engage over a rack 95, carried by the depending bracket 96, and by which means the said lever may be held in its adjusted position to hold the disks inward. This permits of the free rotation of the disks when necessary.

The several steps hereinbefore described having been performed, the ladder-section is complete, as seen in Fig. 21, and the lever 13 is actuated to release the plate or die 6, the tool 78 is removed from the disk 73, and the completed ladder section or link removed from the machine, when the latter is ready for another operation.

While various means may be provided for bending down the rod after it has been formed into the shape seen in Fig. 19 into its horizontal position, as seen in Fig. 20, preparatory to the formation of the hooks or eyes 72 thereon, I have devised a simple and efficient means, which is illustrated in Figs. 10 and 11. It comprises a removable bender 97, the vertical portion of which terminates at its lower end in a rectangular portion 98, designed to detachably engage the opening 41 in the disk 38, and its other end extending laterally and at right angles to the portion 98 to form the arm 99, the end of which terminates in the concaved member 100, which is designed to receive the bar, as will be readily understood from Fig. 11. This bender is inserted in position and the arm 36 engaged by the concaved member 100, and then by manipulation of the lever 55 the gears 49 and the disks 38 are turned, so as to bend the arms 36 down into the horizontal position ready for formation of the eyes or loops 72. It is evident, however, that other means may be provided for thus bending down the arms 36.

For forming the ledge-hook for the top section of the ladder I provide means seen best in Figs. 1, 2, 4, and 6. In these views 101 designates a ledge or plate projecting beyond the end of the table 3 and forming a ledge or support upon which the rod 102 is designed to be supported. At opposite ends this plate or ledge is provided with the inclines 103 to give the necessary bend to the material, as will be readily understood. 104 is the movable die or plate, mounted for reciprocation in suitable guides 105 at the end of the machine and having the beveled ends 106, as seen best in Fig. 6. It is designed to be reciprocated by means of a cam 107, pivoted at 108 and having an operating arm or lever 109, which cam is designed to engage the lever 110, adapted to act upon the cross-bar 111 of the frame carrying the movable die. This lever 110 is fulcrumed at 112 on the bracket 113. In practice the bar is placed in position transversely of the machine and the cam then actuated to bring down the upper die-plates, which gives to the ledge-hook (seen in Fig. 22) the bend 114 with the inclined connecting portions 115. After this has been done the ends are bent down, so as to form the parallel side portion 116, and this is done by means of the shaper 117, carried by the lever 118, pivoted at 119, and having portions projecting from opposite sides of its point of connection with the lever and formed upon the under faces with the inclines or curves 120. This lever and these shapers are centrally disposed with relation to the die-plates, and by turning it in just one direction and then the other the rod or bar will be bent first upon one side and then upon the other side to form the parallel arms, and if the ledge-hook is to be a closed hook, as seen in Fig. 22, the free ends of the two portions 116 are bent inward and welded or otherwise joined, as seen at 121. The hook thus far formed is then removed from that end of the machine and placed in the opposite end, where there is provision for giving it the hook termination seen at 122 in Fig. 23. At the said end of the machine there is provided a projecting ledge or shelf 123, upon which the cross-bar 114 is designed to rest. This ledge or shelf is carried by the support 124, rigidly secured to the end of the machine and having the dovetailed groove 125 extending transversely thereof, as seen best in Fig. 1, into which are inserted from opposite ends the formers 127, which are thus made adjustable therein, and after being inserted in position they are moved so that their curved sockets 126 engage the side bars of the hook, as will be readily understood from Fig. 2, and then the lever 128, pivotally mounted at 129 and having an operating-handle 130 detachably engaged therewith and carrying the inwardly-projecting bends 131, is manipulated and moved in the direction of the arrow seen in Fig. 1, so as to bend the upper portions of the arms 116 to form the hook 122, as will be readily understood. In case an open hook is desired, the free ends of the arms 116 are not bent inward and welded or otherwise joined, the hook portion 132 thereof, as seen in Fig. 24, being formed in the same manner as above described. By making the acting faces of the dies 101 and 106 of varying forms varying shapes may be given to the cross-bar 114. For instance, it may be either straight, as seen at 133 in Fig. 24 by full lines, or bent, as at 134, indicated by dotted lines in the same figure, or as indicated in Fig. 23.

Referring now to Figs. 1 and 2, there will be seen a means adapting the machine for forming awning-irons, such as is shown in Fig. 27. Referring particularly to Fig. 2, 135 is a fixed plate adjustably mounted upon the top of the bed 3 by means of the slots 136 and bolts 137, while 138 is a plate suitably fixed to said bed and having pivotally mounted thereon, as at 139, the levers 140, which are provided near their pivots with the angular portions 141. In practice a rod or bar is placed transversely of the machine, between the meeting faces of the plates 135 and 138, and then the levers manipulated toward each other, when the metal will be bent, as at 142 in Fig. 27, to form an awning-iron shown therein, the eyes in the free ends of the side bars of which may be formed in any suitable manner.

In Fig. 28 I have shown how the terminals of the ladder sections or links may be made with a different form of hook 144.

In Fig. 29 I have shown how a bar or rod may be formed with crimps 145 by placing a different form of tool in the disk 38.

In Figs. 25 and 26 I have indicated by full and dotted lines how the cross-bars 146 and 147 may be formed either straight or inclined upwardly or downwardly, the form being given thereto by means of different configuration of dies or plates employed for giving the initial bend to the rod or bar.

When it is desired to place a rod or bar, as may be advisable, for forming a support for a painter's scaffold, as seen in Fig. 30, or a seat or shelf or other support, as seen in Fig. 31, I provide a twister-hook 148, having a rectangular shank 149, which may be inserted into the central hole in the disk 38, and after the rod has been engaged at its center over said hook and the opposite end secured in any suitable manner—as, for instance, upon the plate 150, mounted on the table 3 and having pins 151, over which the free ends of the rod are engaged—rotary motion is imparted to the disk 38 by manipulation of the lever 55 in a manner hereinbefore described, and the necessary twist 152 will be given to the rod or iron, as seen in Figs. 30 and 32. The loop 153, formed at the central portion of the rod which engages over the hook 148, may be employed to engage the shelf or seat 154, as seen clearly in Fig. 30.

In Fig. 31 I have shown another form of hanger or support 155, which is bent at its central portion to form the cross portion 156, engaged in the seat 157, and the ends of the iron rod are twisted, as at 158, to form a hook.

In Fig. 34 I have shown a modification of the mechanism seen in Fig. 5. This comprises the separate levers 159, pivoted at 160 to the ears or lugs 161, projecting upward from the plate or die 162; the said levers having the lugs 163 projecting laterally therefrom and adapted when bent outward, as seen in dotted lines at the right of Fig. 34, to engage over and bend the rod, as will be readily understood. These dies are provided with the slots 164, by which they are adjustably mounted upon the bed of the machine.

In Figs. 36 and 37 I have shown differently-formed dies 165 and 166, by which different forms may be given to the cross-bars of the sections, these dies being removably inserted in position, as will be readily understood.

In Fig. 33 I have shown another modification, in which cams 166, pivotally mounted at 167 on the bed of the frame and actuated by levers 168, having openings to engage over the pin 169 on said cams, act upon the arms 170, pivotally mounted at 171 and having their ends curved, as at 172, to act in conjunction with the fixed plate or die 162 to give the necessary pressure upon the rod or bar to give it the initial bend, such as is seen in Figs. 25 and 26, the nature of the bend depending upon the character of the die employed.

From the above it will be obvious that I have devised a novel, cheap, and efficient form of metal bending or twisting machine, and while the structural embodiment of my invention as herein disclosed is what I at the present time consider preferable it is evident that the same is subject to changes, variations, and modifications without departing from the spirit of the invention or sacrificing any of its advantages, and I therefore do not wish to be restricted to the details of construction herein disclosed, but reserve the right to make such changes, variations, and modifications as come properly within the scope of the protection prayed.

In Fig. 38 is seen an arrangement whereby the movable die or plate 104 may be actuated by connection with the gear 49. In this view the lever 110 is provided with an annular groove $110^\times$, in which works a tongue $111^\times$ on the cam $107^\times$, and on the pivot or fulcrum $108^\times$ of this cam is a gear-wheel $109^\times$, which meshes with the gear 49, so that the cross-bar 111, carrying the frame which supports the die or plate 104, will be reciprocated in a manner which will be readily understood.

What is claimed as new is—

1. In a metal-bending machine, a set of dies, means for actuating one of them, a rotatable tool-carrying member and interchangeable devices coöperating therewith to give to the metal the various formations desired.

2. In a metal-bending machine, means for giving the initial bend to the metal, means for holding the metal at said bend while subsequent steps are performed, a rotatable tool-carrying member, interchangeable devices coöperating therewith and means common to all of such steps for performing the same.

3. In a metal-bending machine, means for giving the initial bend, means for holding the metal at said bend while subsequent steps are performed, a rotatable tool-carrying member for receiving interchangeable devices and rotatable means coöperative with all of the devices for performing such steps.

4. In a metal-bending machine, dies for forming the initial bend, rotatable tool-holding devices for giving subsequent bends, interchangeable tools for coöperation therewith and means coöperating therewith for twisting the metal.

5. In a metal-bending machine, dies for forming the initial bend, rotatable means for giving subsequent bends, means coöperating therewith for twisting the metal, and means for subsequently bending it from a vertical into a horizontal position.

6. In a metal-bending machine, means for giving the initial bend, means for giving a subsequent bend, means for forming loops in the material, and means for twisting said loops.

7. In a metal-bending machine, means for giving the initial bend, means for giving a subsequent bend, means for forming loops in the material, means for twisting said loops, and means for giving the initial bend and holding the material while it is subsequently operated upon.

8. In a metal-bending machine, an adjustably-mounted fixed die, a movable die, means for actuating the same, a rotatable tool-carrying disk, means for rotating the same and a combined guide and stop for the material.

9. In a metal-bending machine, means for forming the initial bend, means movable at right angles thereto for bending the material at right angles to the initial bend, a rotatable tool-carrying disk and means detachably connected with said disk for forming loops in the material.

10. In a metal-bending machine, means for forming the initial bend, means movable at right angles thereto for bending the material at right angles to the initial bend, a rotatable disk with interchangeable devices, an independent rotatable disk for holding removable devices, means for forming loops in the material, and means for bending the material from a vertical to a horizontal position.

11. In a metal-bending machine, dies for giving the initial bend, means for bending the material at right angles to such bend and bodily vertically adjustable means for twisting the material.

12. In a metal-bending machine, dies for giving the initial bend, means for bending the material at right angles to such bend, and bodily vertically adjustable means for twisting the material, and means for rotating the twisting means.

13. In a metal-bending machine, dies for giving the initial bend, means for bending the material at right angles to said bend, a rotatable disk, and means removably engaged therewith for engaging the material.

14. In a metal-bending machine, dies for giving the initial bend, means for bending the material at right angles to said bend, a rotatable disk, means removably engaged therewith for engaging the material, said disk being provided with a gear, and means engaging said gear.

15. In a metal-bending machine, dies for giving the initial bend, means for forming a bend at right angles thereto, a rotatable disk with interchangeable metal-holding devices, and an independent rotatable disk with removable devices.

16. In a metal-bending machine, dies for giving the initial bend, means for forming a bend at right angles thereto, a rotatable disk with interchangeable metal-holding devices, an independent rotatable disk with removable devices, and a gear common to both of said rotatable means for actuating the same.

17. In a metal-bending machine, dies for giving the initial bend, means for forming a bend at right angles thereto, a rotatable disk with interchangeable metal-holding devices, an independent rotatable disk with removable devices, a gear common to both of said rotatable means for actuating the same, and a vertical movable rotatable twister.

18. In a metal-bending machine, dies for giving the initial bend, means for forming a bend at right angles thereto, a rotatable disk with interchangeable metal-holding devices, an independent rotatable disk with removable devices, a gear common to both of said rotatable means for actuating the same, and a vertical movable rotatable twister operatively connected with said rotating means.

19. In a metal-bending machine, means for performing the several steps, all operative to form the bends by a pull over a bearing-surface.

20. In a metal-bending machine, a fixed die, a movable die and a former pivotally mounted in a central position and movable from side to side for coöperation with opposite corners of the fixed die.

21. In a metal-bending machine, a fixed die, a movable die, a former pivotally mounted in a central position and movable from side to side for coöperation with opposite corners of the fixed die, and a cam and intermediate pivoted lever for operating the movable die.

22. In a metal-bending machine, a frame, a supporting-ledge and laterally-adjustable formers, and a lever for coöperation therewith and having pins to engage the metal to bend it over said formers.

23. In a metal-bending machine, a frame, a supporting-ledge and laterally-adjustable formers, and a lever for coöperation therewith and having pins to engage the metal to bend it over said formers, said formers having concaved portions to engage the metal upon both sides.

In testimony whereof I affix my signature in presence of two witnesses.

WILLIAM A. EHRMANNTRAUT.

Witnesses:
JOHN J. MORRIS,
CHAS. B. CARROLL.